United States Patent
Bullard, Jr. et al.

[15] 3,703,828
[45] Nov. 28, 1972

[54] CAPACITANCE VARIOMETER

[72] Inventors: Edwin R. Bullard, Jr.; Wesley L. Joosten, both of El Paso, Tex.

[73] Assignee: Globe Universal Sciences, Inc., El Paso, Tex.

[22] Filed: Nov. 5, 1969

[21] Appl. No.: 874,221

[52] U.S. Cl. .................................73/179, 73/398 C
[51] Int. Cl. ..............................................G01c 21/00
[58] Field of Search.............73/179, 398 C; 317/246; 331/65

[56] References Cited

UNITED STATES PATENTS 3,237,449   3/1966   Brandt......................73/398 X
3,374,671   3/1968   Williams et al..............73/179

*Primary Examiner*—Donald O. Woodiel
*Attorney*—Arnold, White & Durkee, Paul VanSlyke, Tom Arnold and Robert A. White

[57] ABSTRACT

An electronic variometer or rate of climb indicator of the diaphragm capacitance type, having improved sensitivity and response time. Pressure is sensed by differential pressure transducer having dual capacitor elements and a diaphragm which deflects in response to changes in pressure. A leak tube extends from a back chamber within the pressure transducer into an atmospheric chamber. The problem of non-linearity is overcome by the use of the dual capacitor elements which are connected in circuit to adjust the frequency of oscillation of a square-wave oscillator. The two channel output of the oscillator is passed through filter networks to eliminate the oscillation frequency and is then sent to a differential amplifier and displayed on a meter.

5 Claims, 9 Drawing Figures

NO PRESSURE CHANGE

OVER PRESSURE

UNDER PRESSURE

Edwin R. Bullard, Jr.
Wesley L. Joosten
INVENTORS

BY Arnold, Roylance,
Kruger & Durkee
ATTORNEYS

PATENTED NOV 28 1972 3,703,828
SHEET 3 OF 3
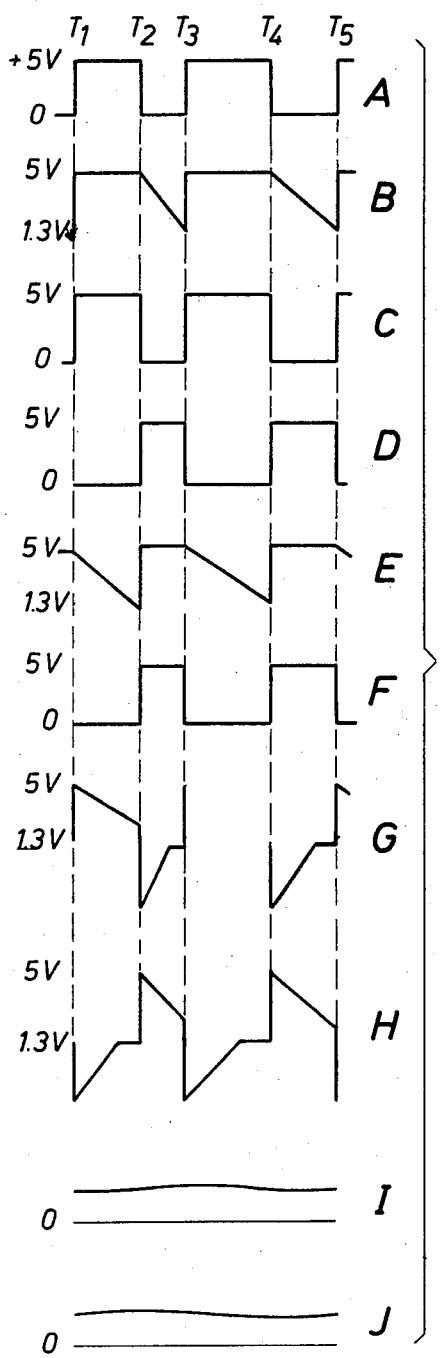
FIG. 5
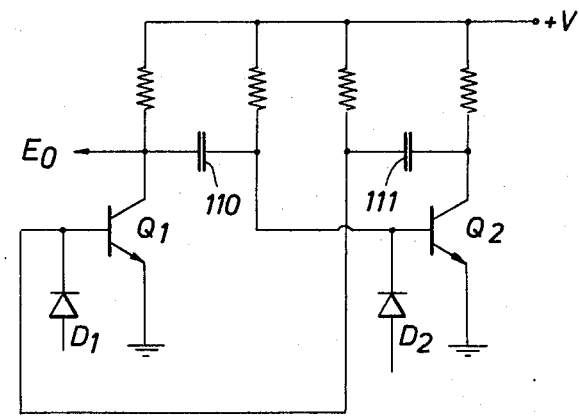
FIG. 6
FIG. 7
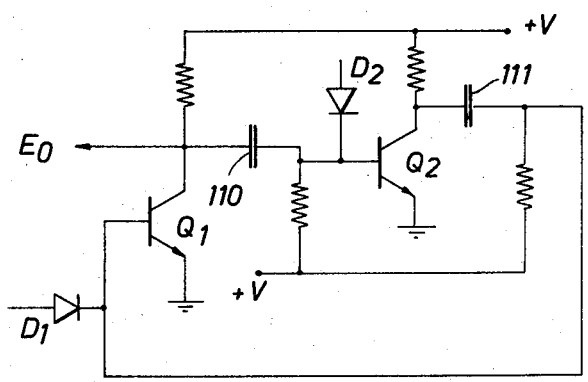
Edwin R. Bullard, Jr.
Wesley L. Joosten
INVENTORS
BY Arnold, Roylance,
Kruger & Durkee
ATTORNEYS

CAPACITANCE VARIOMETER

BACKGROUND OF THE INVENTION

This invention relates to an instrument for detecting changes in altitude and, more particularly, to a diaphragm capacitance type of electronic variometer or rate of climb indicator.

Variometers or rate of climb indicators are used in aircraft to measure the change in altitude with respect to time. Certain existing variometers use purely mechanical elements to produce an indication of the rate of climb. These mechanical units, while reliable, leave much to be desired in quickness of response and sensitivity.

Electronic variometers are also known and used. For example, in "Soaring" magazine dated January, 1967, pages 22-23, there is described an electronic variometer which measures deflection of a diaphragm by means of variable inductors. In an electronic type variometer, the pressure transducer is ordinarily of the diaphragm type where a measurement is made of the deflection of a diaphragm membrane from its zero position in response to pressure variations. Most of these pressure transducers include a housing with an atmospheric chamber which is exposed to the ambient atmosphere and are enclosed in a back chamber, the diaphragm separating the two chambers. The deflection of the diaphragm is proportional to the change in pressure of the ambient atmosphere. A conduit or leak tube extends between the two chambers to allow adjustment of the transducer for changes in pressure due to other than changes in altitude, as for example, changes in the conditions of the weather. The leak tube also sets the pneumatic time constant for the response time of the transducer.

One means for measuring the deflection of a diaphragm type pressure transducer in a variometer is by electrostatic or capacitive means. For example, see U. S. Pat. No. 3,374,671, issued to S. B. Williams, et al., in which stator plates are placed on either side of a diaphragm in a pressure transducer so that two capacitive elements are formed. Each stator plate is connected to a bridge circuit which measures the change in capacity in response to deflection of the diaphragm and produces an output indication proportional to the deflection of the diaphragm.

For maximum accuracy, it is desirable to have a linear relationship between the output indication of rate of change in altitude and the deflection of the diaphragm. Unfortunately, the deflection of the diaphragm is inversely proportional to the change in capacitance in a capacitor type transducer. For a capacitor having two plates, the capacitance is given by the following formula:

$$(1)\ C = KA/d$$

where $C$ is the capacitance, $A$ is the area of the smallest plate, $K$ is the dielectric constant and $d$ is the spacing between the two plates. From formula (1), it can be seen that the value of capacity is inversely proportional to the spacing between the two plates and hence the deflection of the diaphragm. Accordingly, the relationship between deflection of the diaphragm and capacitance is a non-linear function having the shape of a hyperbole.

For a pressure transducer having two capacitive elements, which are spaced equal distances on either side of a diaphragm and where the stators have equal areas, it can be shown that the ratio of the capacity of one of the two capacitors to the sum of the two capacitors is equal to one half of the deflection of the diaphragm. This can be expressed by the following formula, where $C_A$ is the capacity of one element and $C_B$ is the capacity of the other element:

$$(2)\ C_B/C_A + C_B$$

Hence, measurement of deflection of a diaphragm can be made linear by use of a dual capacitor transducer and a suitable circuit that will perform the mathematical operation according to formula (2). One circuit which has the operating characteristic to perform this function is a free running multivibrator. For example, use of a free running multivibrator to produce linear output in a capacitor microphone circuit is described in U. S. Pat. No. 3,440,348 issued to J. W. Merrick. Unfortunately, the conventional free running multivibrator requires the use of capacitors which are electrically isolated from each other. This electrical isolation is difficult to achieve in a dual capacitor type pressure transducer because it is difficult to avoid an electrical connection between the plates of both capacitors at the diaphragm element. Attempts have been made as evidenced by the Williams, et al. patent identified above to measure the capacitance of a pair of capacitors, by connecting the capacitors in a "floating" configuration. This technique places stray capacitance in parallel with the capacitance between the diaphragm and the stator plate; for example, the capacitances between the diaphragm and the case or housing and the terminals and wires.

SUMMARY OF THE INVENTION

It is an object of this invention to provide a variometer in which the diaphragm of a pressure transducer having dual capacitor elements can be grounded so that the two capacitor elements need not be floating in a connection with an oscillator circuit.

A variometer embodying the present invention employs a differential pressure transducer having a sensing element that deflects in response to changes in ambient atmospheric pressure and a pair of capacitive elements. The capacitance of each capacitive element varies oppositely in response to deflection of the sensing element in a push-pull mode of operation. Two plates of the capacitive element may be coupled together and connected to a fixed potential such as ground, while the other two plates are connected to an oscillator circuit. The oscillator circuit generates a pair of output signals whose frequency is modulated in accordance with the change in capacitance of the capacitive elements. A pair of filter circuits is coupled to the two channels of the oscillator circuit, the filter circuits having a band pass to exclude the frequency of the oscillator carrier. The outputs of the filter circuits are then applied to a differential amplifier and the difference signal is displayed on a meter. The reading on the meter is thus proportional to the deflection of the diaphragm. By virtue of having two channels which are produced from two separate capacitive elements the sensitivity of the instrument is doubled compared with a pressure transducer having a single capacitive element.

BRIEF DESCRIPTION OF THE DRAWINGS

The invention will now be described by way of example with reference to the accompanying drawings in which:

FIG. 5 illustrates waveforms appearing in the circuit of FIG. 4.

FIG. 6 is a schematic diagram of the equivalent circuit for the standard astable multivibrator appearing in FIG. 4; and FIG. 7 is a schematic diagram of the equivalent circuit for the circuit of FIG. 4.

DETAILED DESCRIPTIONS OF THE DRAWINGS

1. General

Figure 1:
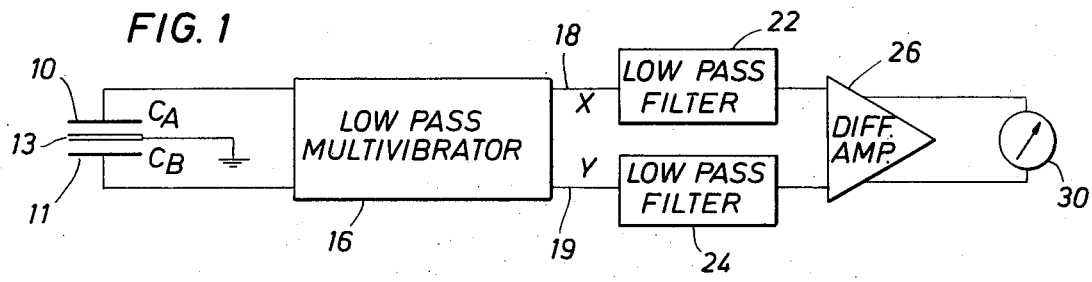
FIG. 1 is a block diagram of the basic elements of one variometer embodying the present invention.

Referring to FIG. 1, the pressure transducer is designated schematically as having a pair of stator plates 10 and 11 which are located on opposite sides of a diaphragm 13. Diaphragm 13 may be two separate components which are placed close together so as to deflect in conformity with each other, or alternatively, may be a single diaphragm which is clad on both sides by a conductive coating. Stator plate 10 and diaphragm 13 form one capacitor denoted $C_A$. Stator plate 11 and diaphragm 13 form the other capacitor denoted $C_B$. The diaphragm 13 is shown electrically grounded.

The stator plates 10 and 11 are connected to a squarewave oscillator circuit 16 which is denoted a "Low Pass Multi-vibrator." The details of the circuit will be described below, but for now, suffice it to say that the capacitance of capacitor $C_A$ and $C_B$ determines the duty cycle of the multivibrator 16. Multivibrator 16 has a pair of outputs 18 and 19 which are coupled respectively to a pair of low pass filters 22 and 24. Low pass filters 22 and 24 block the frequency of the multivibrator 16 and pass the average value corresponding with the change in capacitance of capacitors $C_A$ and $C_B$. The output signal from the low pass filters 22 and 24 is applied to a differential amplifier 26 where the difference signal is taken and used to drive a meter 30. Thus, the reading on the meter 30 is linearly proportional to the deflection of the diaphragm 13. The calibration of the instrument can be adjusted by changing the gain of the differential amplifier 26.

Figure 2A:
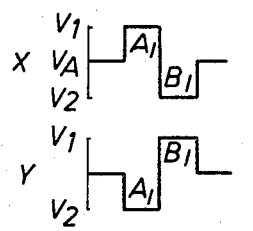
FIG. 2A–2C are waveforms appearing at points X and Y in the circuit of FIG. 1 for different pressure conditions.
Figure 2B:
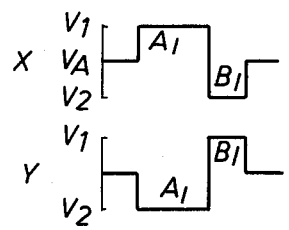
Figure 2C:
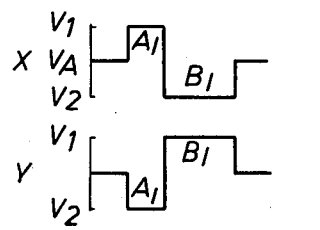

The operation of the circuit of FIG. 1 can be explained by reference to FIGS. 2A–2C, which illustrate waveforms appearing at points X and Y in the circuit of FIG. 1 for different pressure conditions. In FIG. 2A, there is shown the waveforms at X and Y when there is no pressure change and the diaphragm 13 does not deflect from its zero position. Hence, the area $A_1$, is equal to the area $B_1$, so the inputs to low pass filters 22 and 24 are balanced square waves. The output of the filters 22 and 24, therefore, is a zero value and meter 30 reads zero. Now, referring to FIG. 2B, there is illustrated the waveforms for the output of the multivibrator 18 for a condition of increase in pressure. Hence, the area $A_1$ is greater than the area $B_1$, so that there is a positive average value which is applied to differential amplifier 26. When there is a decrease in pressure as shown in FIG. 2C, the area $B_1$ is greater than the area $A_1$, so that the meter 30 reads down.

2. The Pressure Transducer

Figure 3:
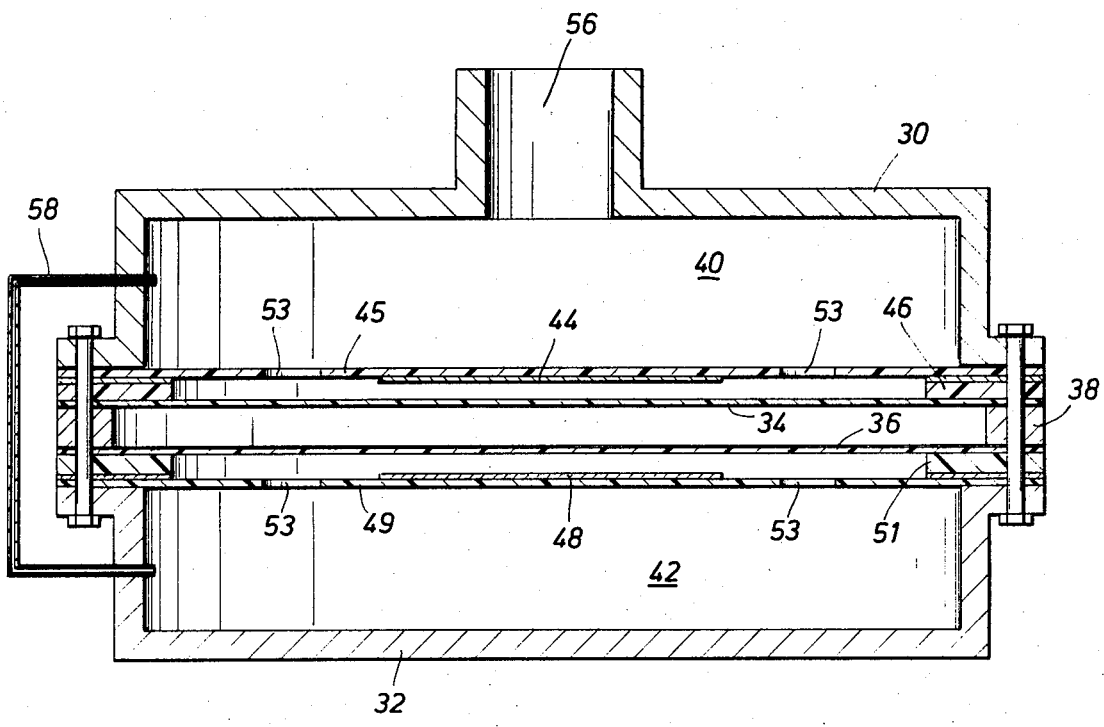
FIG. 3 is a schematic cross-sectional view of the differential pressure transducer suitable for use in accordance with the present invention.

Referring to FIG. 3, there is illustrated one pressure transducer which is suitable for use in the invention. The transducer includes an upper cylindrical housing 30 and a lower cylindrical housing 32. Clamped between housings 30 and 32 are a pair of circular diaphragms 34 and 36 which are separated by a ring-shaped spacer 38. In the drawing, the diaphragms 34 and 36 are shown in exaggerated separation for clarity, but in actual practice they may be on the order of 5/1000ths of an inch apart. The diaphragms 34 and 36 separate the interior of the pressure transducer into an atmospheric chamber 40 and a back chamber 42. The atmospheric chamber 40 is exposed to the atmosphere through an aperture 56. Positioned parallel to the diaphragm 34 in the atmospheric chamber 40 is a stator plate 44 which is supported by a plate 45 that is clamped at the edges of the upper cylindrical housing 30. A ring-shaped spacer 46 separates the supporting plate 45 from the diaphragm 34.

Similarly, a stator plate 48 is supported adjacent diaphragm 36 on a mounting plate 49. Mounting plate 49 is separated from the diaphragm 36 by a ring-shaped spacer 51.

The stator plates 44 and 48 may be of any suitable metallic material, but are preferably comprised of copper. The supporting plates 45 and 49 are preferably constructed of fiberglass. It will be noted that each of supporting plates 45 and 49 has apertures 53 which provide for free flow of air between the stator plates and the diaphragm as deflection of the diaphragms occur.

The diaphragms 34 and 36 can be comprised of any suitable membrane material with a metallic layer, but are preferably constructed of an aluminum-clad polyester material sold under the trademark MYLAR. The layer of aluminum is located preferably on the opposite side from the stator plates 44 and 48. Alternatively, the aluminum layer can be on the side adjacent to stator plates if a suitable insulator is provided between the diaphragm and the stator plates.

A leak tube 58 extends from the atmospheric chamber 40 to the back chamber 42. The pneumatic time constant for leak tube 58 is adjusted to give the desired response time for the pressure transducer.

3. Circuit Design Example

Figure 4:
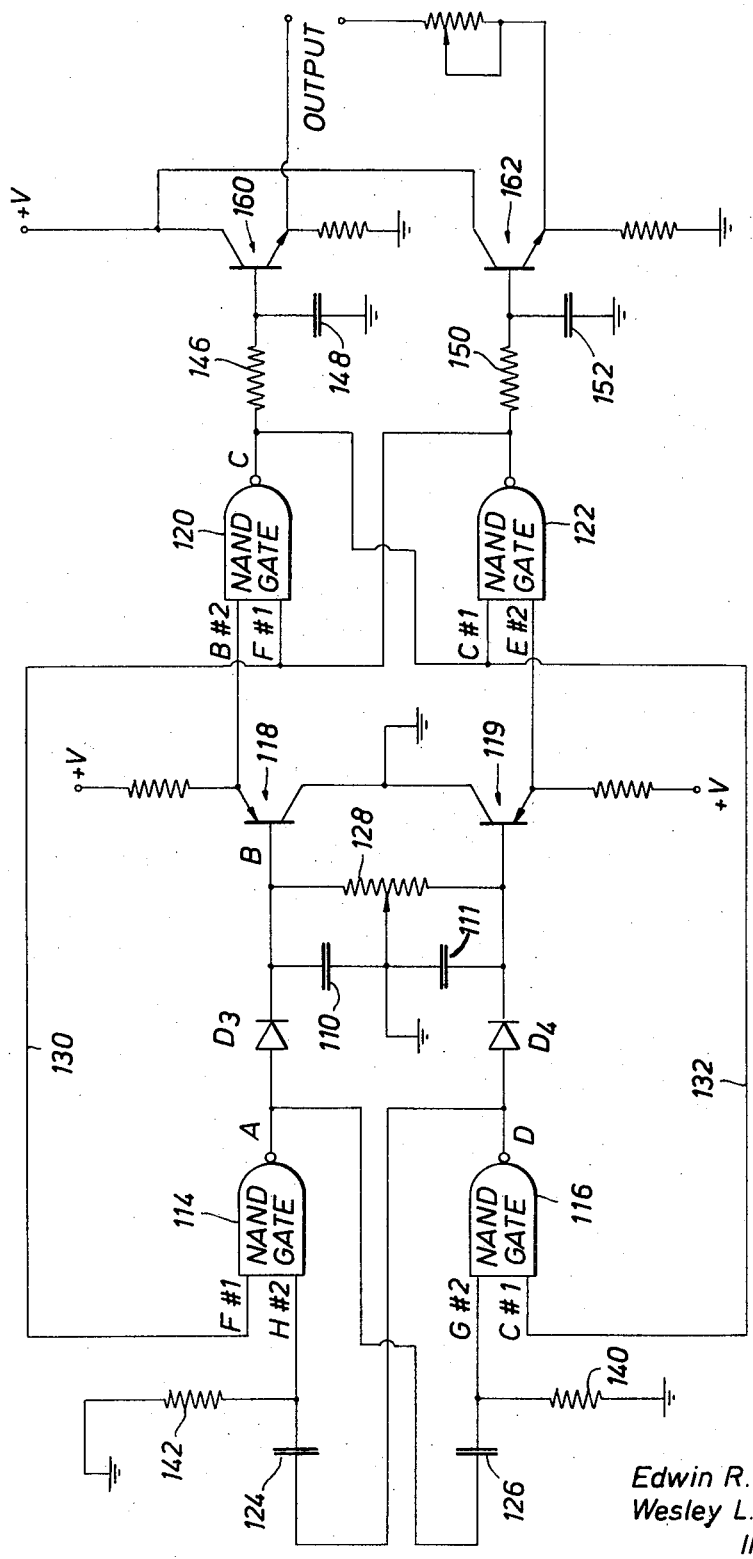
FIG. 4 is a schematic diagram of a low pass multivibrator circuit.

FIG. 4 is a schematic diagram of a circuit design example for the block diagram of FIG. 1. The capacitors 110 and 111 represent the capacitors $C_A$ and $C_B$ in FIG. 1. In the circuit illustrated, there are four basic stages:

1. A free running multivibrator stage of conventional type including NAND gates 114 and 116;
2. A pair of low pass networks including capacitors 110 and 111;
3. A pair of emitter follower circuits comprising transistors 118 and 119; and
4. a set-reset bistable multivibrator comprising NAND gates 120 and 122.

In the following, the term NAND gate will be used in the sense of an inverting AND gate; that is, a logical device which produces a logical output "0" condition only when a pair of logical "1" conditions are coincident on the inputs.

The free running multivibrator stage, comprising NAND gates 114 and 116, is shown with integrated circuits as the active elements. The equivalent circuit diagram for transistor circuitry is illustrated in FIG. 6, where diodes $D_1$ and $D_2$ correspond with inputs No. 1 to gates 14 and 16 (FIG. 4). The circuit of FIG. 6 is shown in equivalent form in FIG. 4 to illustrate that capacitors 124 and 126 act as high pass filters for the interstage coupling networks between transistors $Q_1$ and $Q_2$. Thus, the conventional astable multivibrator can be called a "high pass multivibrator" because of the high pass interstage coupling network.

Referring again to FIG. 4, it can be seen that the present invention includes low pass interstage coupling networks comprising the capacitors 110 and 111 and the resistance of the voltage divider 128. Hence, the circuit is termed a "Low Pass Astable Multivibrator."

It will be observed that because there is no a-c coupling between the astable multivibrator comprising NAND gates 114 and 116, and the bistable multivibrator comprising NAND gates 120 and 122, there must be some active triggering or synchronizing signals to keep the circuit oscillating. Continuous oscillation is provided by the astable multivibrator including NAND gates 114 and 116, but the circuit is controlled by the time constant associated with capacitors 110 and 111. The bistable multivibrator comprising NAND gates 120 and 122 provide gate control signals which are applied through lines 130 and 132 to NAND gates 114 and 116 respectively.

The waveforms which appear in the circuit of FIG. 4 are illustrated in FIG. 5 and are keyed by letters to the points in the circuit in FIG. 4 at which the waveforms occur.

Referring to both FIGS. 4 and 5, there will be described the operation of the astable multivibrators comprising NAND gates 114 and 116, without regard to the effect of the gating signals applied to lines 130 and 132. For the purposes of illustration, logic levels of +5.0 volts will be used to indicate a 1 condition and 1.3 volts for a logical 0 condition. Assume first that the output of NAND gate 114 is at +5.0 volts at the time $T_1$, as indicated by waveform A. Capacitor 126 charges to +5.0 volts and immediately turns on NAND gate 116. During the period from the time $T_1$–$T_2$ capacitor 126 discharges through resistor 140 until a level of 1.3 volts is reached, at which time gate 116 is turned off and the output indicated by waveform D goes to +5.0 volts. When the output of gate 116 goes to +5.0 volts at time $T_2$, capacitor 124 is charged to +5.0 volts, turning on gate 114. During the time $T_2$– $T_3$ capacitor 124 discharges through resistor 142 to 1.3 volts, at the end of which time gate 114 is turned off and the output indicated by waveform A goes to +5.0 volts. signals applied on lines 130 and 132. It will be noted that if at any time either input No. 1 to gate 114 or input No. 2 to gate 116 is held at the 1 condition, the operation of the astable multivibrator will not be affected. However, if either of these gate control inputs is changed to the 0 condition, the operation of the astable multivibrator will be affected. For example, if the input No. 2 to gate 116 is inhibited by the 0 condition (as shown by waveform C at time $T_2$) prior to the time at which input No. 1 would normally reach a 0 condition (+1.3V as shown by waveform G after $T_2$), the output of gate 116 will be switched to the 1 condition as shown by waveform D. Thus, by alternately placing a 0 condition on lines 130 and 132, the astable multivibrator is made to oscillate at a frequency which is higher than the free running frequency. This free running frequency is determined by the time constants of the frequency determining networks, capacitor 124 — resistor 142 and capacitor 126 — resistor 140. Although this free running astable multivibrator can be thusly synchronized when the free running frequency is from 0.1 to 1.3 times the synchronizing frequency, best operation is achieved when the astable multivibrator is adjusted to free run at a frequency of from 0.5 to 0.75 times the desired synchronizing frequency, where the "desired synchronizing frequency" is that as determined by the low pass networks, capacitor 110 — resistor 128 and capacitor 111 — resistor 128.

Now consider the operation of the remaining portion of the circuit and in particular the low pass networks, including capacitors 110 and 111 and the bistable multivibrator including NAND gates 120 and 122.

Assume tat at time $T_1$ the output of NAND gate 116 as shown by waveform D switches from the 1 to the 0 condition. This 0 condition of waveform D is applied to the gate 2 of NAND gate 114 through capacitor 124 and causes the output to go to a 1 condition as shown by waveform A, without regard for the signal at input No. 1 as shown by waveform F.

When the output of NAND gate 114 switches to 1 at $T_1$, capacitor 126 is charged to 5 V and begins to discharge to zero as shown by waveform G. At the same time $T_1$ that the output of NAND gate 116 switched from the 1 to the 0 condition, diode D4 disconnects the low pass circuit of capacitor 111 — resistor 128 from the output of NAND gate 116, thus allowing capacitor 111 to discharge to zero through resistor 128 as shown by waveform E. Since the time constant of the low pass network of capacitor 111 — resistor 128 is smaller than the time constant for the network of capacitor 126 — resistor 140, the voltage as shown by the waveform E will reach a 0 condition (+1.3 volts) at time $T_2$ before the voltage as shown by waveform G.

Thus, at time $T_2$, the input No. 2 to NAND gate 122 becomes a 0 condition as shown by waveform E; and the output of NAND gate 122 becomes a 1 as shown by waveform F, without regard for the signal at input No. 1 as shown by waveform C.

It was previously explained how the output of NAND gate 114 as shown by waveform A went to the 1 level at $T_1$. This causes the input No. 1 to NAND gate 120 to become a 1 condition at $T_1$ as shown by waveform B. At $T_2$, when the output of NAND gate 122 as shown by waveform F became a "1" condition, the two inputs to NAND gate 120, being both in the 1 condition, cause the output as shown by waveform C to become a 0 condition. The 0 condition on line 132 resets NAND gate 116 as previously explained so that its output becomes a 1 condition as shown by waveform D.

This switching of NAND gate 116 output from a 0 condition to a 1 condition at time $T_2$ causes a 1 condition to be applied to gate No. 2 input of NAND gate 114 as shown by waveform H. The input No. 1 to NAND gate 114 was already in a 1 condition as previously explained. Thus, with both inputs now 1, the output of NAND gate 114 switches to 0 condition and starts the other half cycle of operation involving the discharge of capacitor 110 through resistor 128 in the same manner as just described for capacitor 111 discharging through resistor 128.

The emitter follower circuits comprising transistors 118 and 119 provide for interstage impedance matching. Diodes $D_3$ and $D_4$ provide for isolation of gates 114 and 116 during discharge of capacitors 110 and 111.

The input No. 2 to NAND gate 120 provides what might be considered the set pulse for the bistable multivibrator, and the input No. 2 to NAND gate 122 provides the reset pulse. It will be noted that the output of the bistable multivibrator is tied by gate control lines 130 and 132 to the astable multivibrator. Hence, the astable multivibrator is slaved to the bistable multivibrator, but the astable multivibrator provides the driving waveforms for the capacitors 110 and 111. Capacitors 110 and 111 merely determine the time constant for the operation of the astable multivibrator. The bistable multivibrator provides for storage of the condition indicated by the time constant of capacitors 110 and 111 during the period when the astable multivibrator is cycling through its operation. For example, the bistable multivibrator stores the time $T_2$-$T_3$ which is required for discharge through capacitor 110 and also stores the time $T_3$ and $T_4$ which is required for discharge of capacitor 111.

The outputs from NAND gates 120 and 122 as shown by waveforms C and F are applied respectively to a pair of low pass filter networks, one comprising resistor 146 and capacitor 148 and the other comprising resistor 150 and capacitor 152. These low pass filter networks remove the high frequency waveforms generated by the multivibrators and leave only the average value or d-c value which is proportional to the change in capacitance of capacitors 10 and 11. These average values are shown by waveforms I and J in FIG. 2. The filtered waveforms are then applied to the differential amplifier comprising transistors 60 and 62. The difference signal from the differential amplifier is then applied to a suitable indicator such as the D'Arsonval meter 30 of FIG. 1.

What is claimed is:

1. A variometer comprising:
   a. a differential pressure transducer having a sensing element that deflects in response to changes in ambient pressure and effects relative movement of a pair of capacitive elements, the capacitance of each element varying oppositely in response to deflection of said sensing element, said capacitive elements having one plate electrically connected in common with each other at a fixed potential;
   b. an oscillator circuit connected to said capacitive elements, said oscillator circuit being adapted to generate a pair of output signals whose frequencies are modified in accordance with the capacitance of said capacitive elements;
   c. a pair of filter circuits coupled to said oscillator circuit to receive said output signals, said filter circuit having a pass band so as to exclude the frequency of said oscillator circuit;
   d. combining means, said filter circuits being coupled to the inputs of said combining means, said combining means being adapted to combine the outputs of said filter circuits; and
   e. an indicator coupled to said combining means and being responsive to the output of said combining means for displaying an indication of the actual deflection of said sensing element.

2. A variometer as defined in claim 1 wherein said oscillator circuit comprises:
   an astable multivibrator circuit, said astable multivibrator circuit having a pair of gate control inputs;
   a bistable multivibrator circuit having a set and reset input, the two outputs of said bistable multivibrator being connected respectively to said gate control inputs of said astable multivibrator, the two outputs of said bistable multivibrator also being coupled respectively to said filter circuits;
   said pair of capacitive elements being coupled together at a common juncture, each of said capacitive elements being coupled respectively to an output of said astable multivibrator, the outputs of said astable multivibrator circuit being connected respectively to the set and reset inputs of said bistable multivibrator, whereby said bistable multivibrator circuit is triggered by said astable multivibrator circuit.

3. A rate of climb indicator, comprising:
   a. a housing having a back chamber and an atmospheric chamber, said atmospheric chamber being adapted to be exposed to the atmosphere;
   b. at least one diaphragm in said housing, said diaphragm separating said atmospheric chamber from said back chamber;
   c. a conduit extending between said atmospheric chamber and said back chamber to provide a response time constant;
   d. a pair of stator plates respectively disposed in said atmospheric chamber and said back chamber adjacent to said diaphragm, each stator plate forming a separate capacitive element with said diaphragm;
   e. an oscillator circuit connected to said capacitive elements, said oscillator circuit being adapted to generate a pair of output signals whose frequencies are modulated in accordance with the capacitance of said capacitive elements;
   f. a pair of filter circuits coupled to said oscillator circuit to receive said output signals, said filter circuits having a pass band so as to exclude the frequency of said oscillator circuit;
   g. a differential amplifier, said filter circuits being coupled to the input of said differential amplifier; and
   h. an indicator coupled to said differential amplifier for displaying an indication of the deflection of said sensing element.

4. A rate of climb indicator as defined in claim 3 wherein said electronic oscillator circuit comprises:
   an astable multivibrator circuit having a first and second gate control input and first and second outputs;
   a first of said capacitive elements being coupled between said first output of said multivibrator circuit and a point of fixed potential;

a second of said capacitive elements being coupled between said second input of said multivibrator circuit and said point of fixed potential;

a first NAND gate having a first and second input and an output, said first input of said first NAND being d-c coupled to said output of said multivibrator circuit, said second input of said first NAND gate being connected to said first gate control input of said multivibrator circuit;

a second NAND gate having a first and second input and output, said output of said second NAND gate being coupled to said second input of said first NAND gate, said first input of said second NAND gate being coupled to said output of said first NAND gate and also to said second gate control input of said multivibrator circuit, said second input being d-c coupled to said second output of said multivibrator circuit;

said outputs of said first and second NAND gates being coupled to said pair of filter circuits.

5. A variometer comprising:

a differential pressure transducer having a sensing element that deflects in response to changes in ambient pressure and a pair of capacitive elements, the capacitive of each capacitive element varying oppositely in response to deflection of said sensing element, said capacitive elements having one plate electrically connected in common with each other at a fixed potential;

means coupled to said capacitive elements for generating a pair of signals whose frequencies are modulated in accordance with the capacitance of said capacitive elements;

means coupled to said means for generating a pair of signals for producing a pair of average value signals having an amplitude proportional to the change in capacitance of said capacitive element; and means for indicating said pair of average value signals, whereby there will be produced an output indication proportional to the actual deflection of said sensing element.

* * * * *

PO-1050
(5/69)

UNITED STATES PATENT OFFICE
CERTIFICATE OF CORRECTION

Patent No. 3,703,828            Dated November 28, 1972

Inventor(s) Edwin R. Bullard, Jr. and Wesley L. Joosten

It is certified that error appears in the above-identified patent and that said Letters Patent are hereby corrected as shown below:

In Column 5, line 58, after the word "volts." add as the beginning of a new paragraph --The above description has been made for the operation of the astable multivibrator without consideration of the gating--;

Signed and sealed this 24th day of April 1973.

(SEAL)
Attest:

EDWARD M. FLETCHER, JR.        ROBERT GOTTSCHALK
Attesting Officer                 Commissioner of Patents

UNITED STATES PATENT OFFICE
CERTIFICATE OF CORRECTION

Patent No. 3,703,828     Dated November 28, 1972

Inventor(s) EDWIN R. BULLARD, JR., ET. AL.

It is certified that error appears in the above-identified patent and that said Letters Patent are hereby corrected as shown below:

Claim 3, line 5), "sensing element" should read -- diaphragm -- . Claim 4, line 6, after "NAND", insert -- gate -- ; line 6, after "said", first occurrence, insert -- second -- ; line 17, after "input", insert -- of said second NAND gate -- . Claim 5, line 15, "element" should read -- elements -- .

Signed and sealed this 20th day of November 1973.

(SEAL)
Attest:

EDWARD M. FLETCHER, JR.
Attesting Officer

RENE D. TEGTMEYER
Acting Commissioner of Patents

FORM PO-1050 (10-69)